Jan. 8, 1957. J. I. PANKOVE 2,777,057

RADIATION POWERED TRANSISTOR CIRCUITS

Filed Dec. 16, 1952. 3 Sheets-Sheet 1

INVENTOR.

JACQUES I. PANKOVE

BY H. C. Newton

ATTORNEY

RADIATION POWERED TRANSISTOR CIRCUITS

Filed Dec. 16, 1952 3 Sheets-Sheet 2

INVENTOR.
JACQUES I. PANKOVE
BY H. C. Newton
ATTORNEY

Jan. 8, 1957. J. I. PANKOVE 2,777,057

RADIATION POWERED TRANSISTOR CIRCUITS

Filed Dec. 16, 1952 3 Sheets-Sheet 3

INVENTOR.

JACQUES I. PANKOVE

BY H. G. Newton

ATTORNEY

United States Patent Office 2,777,057

Patented Jan. 8, 1957

2,777,057

RADIATION POWERED TRANSISTOR CIRCUITS

Jacques I. Pankove, Princeton, N. J., assignor to Radio Corporation of America, a corporation of Delaware Application December 16, 1952, Serial No. 326,295

The terminal fifteen years of the term of the patent to be granted has been disclaimed 10 Claims. (Cl. 250—20)

The present invention relates generally to high frequency signal translating circuits and more particularly to signal receiving systems employing semi-conductor devices.

Compact receiving systems find wide application in military operations in the field where information must be sent to many points from a central command post. Such receiving systems also find wide application in civil organizations such as civil defense and police units which may employ radio communication to coordinate a multitude of operations from a central headquarters. In each of these instances it is generally necessary to maintain the receiving device in a standby condition, that is, in such a condition as to effectively receive signals at all times. This requirement of continuous operation necessarily results in the consumption of considerable operating power in conventional circuits. In the past it has been customary to utilize power storing devices such as dry cell batteries in portable units to provide this operating power. This resulted in a rather large bulk and a continuing maintenance problem.

The requirements for a portable receiving system include small weight and bulk for ease of portability and a power source having a relatively long life and being light and compact.

It is, therefore, an object of this invention to provide a radio receiving system which has a relatively long operating life and which requires no local source of operating power.

A further object of this invention is to provide a radiation powered radio receiving system incorporating a semi-conductor amplifier of improved efficiency.

Another object of this invention is to provide a radiation powered radio receiving system which is compact, efficient in operation and which is relatively inexpensive to manufacture.

In one aspect of the present invention, a radio receiving system is provided with circuit means including a semi-conductor device or transistor for receiving and amplifying high-frequency signal modulated carrier waves. A non-linear conducting device such as, for example, a crystal rectifier is provided to rectify the received carrier wave. A portion of the rectified energy is stored in an energy storage device such as a capacitor and is used to provide operating voltages for the transistor amplifier. A tunable circuit is provided in conjunction with the amplifier for selecting a carrier wave of predetermined frequency to be amplified.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

Figure 1:
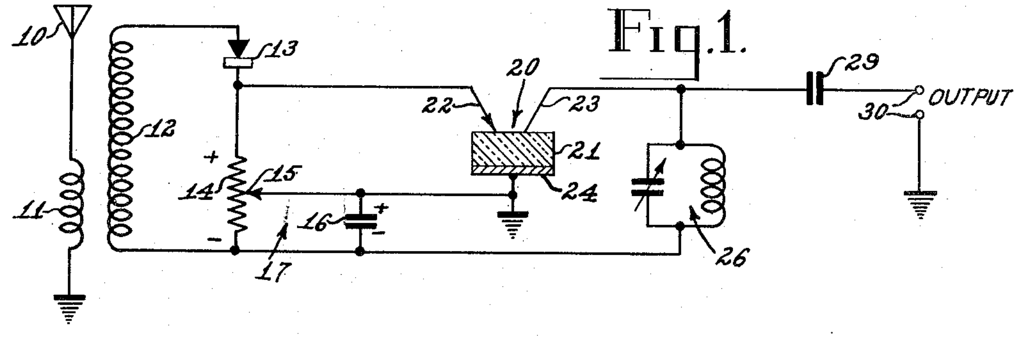
Figure 1 is a schematic circuit diagram of a radio receiving system showing one embodiment of the present invention.

Referring now to the drawings, and in particular to Figure 1, signal energy which is received by an antenna 10 sets up alternating currents through the antenna inductor 11. Due to the inductive coupling between the antenna inductor 11 and the input inductor 12, alternating currents are thereby induced in the input inductor 12. These latter alternating currents are rectified by a crystal rectifier 13 which may be of the type commonly referred to as 1N72. Due to the rectification by the crystal rectifier, a unidirectional voltage is established across the load resistor 14 having a polarity as shown in Figure 1. A portion of the voltage which is to be amplified is developed across the load resistor 14 and is applied between the emitter electrode 22 and the base electrode 24 of a transistor 20. The value of this applied voltage is determined by the setting of the variable tap 15. The remaining portion of the load resistor 14 and the shunt connected storage capacitor 16 comprise an energy storing network and in this instance must have a time constant which is long relative to the lowest frequency of the amplified signal.

When such a network is provided which has a relatively long time constant, there will be developed across the storage capacitor 16 a voltage which is substantially uniform and which has a polarity such as shown.

It can be seen that this voltage will be applied between the base electrode 24 and the collector electrode 23 of the transistor 20 thus providing an operating bias between these electrodes.

It is noted at this time that the crystal rectifier 13 is poled in such a direction as to provide a reverse bias between the base electrode 24 and the collector electrode 23. With the polarities as shown in the drawing, it is assumed that the transistor 20 comprises a semi-conductive body 21 of N type material. If the semi-conductive body 21 were of P type material, the crystal rectifier 13 would have to be reversed in polarity in order to provide operating potentials of a correct polarity.

The voltage which is developed across that portion of the load resistor 14, which is between the variable tap 15 and the crystal rectifier 13, is applied between the emitter electrode 22 and the base electrode 24 and is amplified and appears in amplified form across the parallel tuned output circuit 26. The parallel tuned circuit 26 operates as a frequency selecting device and, therefore, provides amplification for only a definite predetermined frequency.

It is noted that this amplifier circuit operates in what is commonly referred to as class B, as there exists no static bias between the emitter electrode 22 and the base electrode 24.

It is possible to provide a receiving system which operates in accordance with the present invention as above described by having an antenna system which is broadly tuned and which, therefore, accepts energy from a wide frequency spectrum. This large band of energy is operated on by the crystal rectifier 13, the load resistor 14 and the storage capacitor 16 to provide the necessary operating potentials. However, only a narrow portion of the received energy is selected and amplified by the transistor amplifier due to the parallel tuned output circuit 26. It is thus possible to provide a compact receiver which receives its operating power solely from radiated energy.

Figure 2:
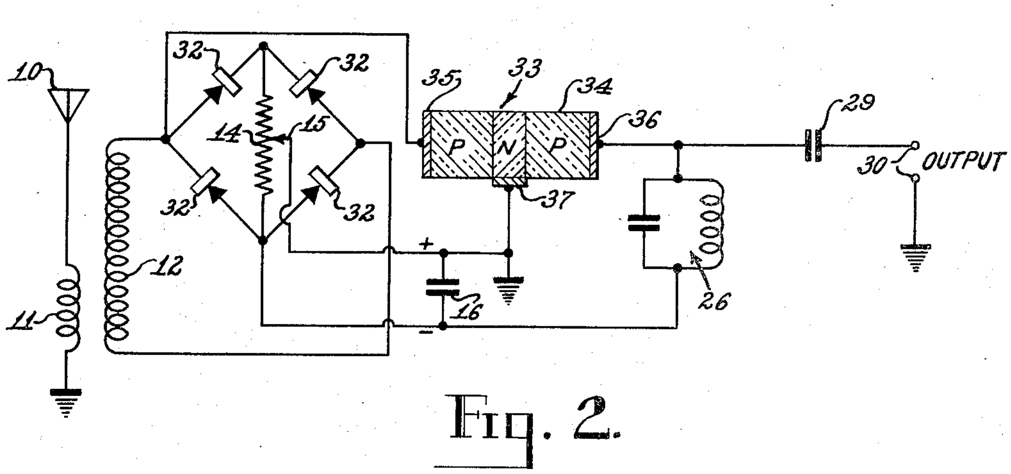
Figure 2 is a schematic circuit diagram of a radio receiving system provided in accordance with the present invention and having a greater efficiency than the embodiment illustrated in Figure 1.

Referring now to Figure 2 wherein there is shown a receiving system of the same general characteristic as above described which is capable of operating at greater efficiency. Signal energy is received by an antenna 10, and as above discussed, causes alternating currents to be set up in an input inductor 12 which is magnetically coupled as above described to the antenna inductor 11. Four crystal rectifiers 32 connected in a bridge circuit operate as a full wave rectifier to rectify the alternating signal currents and thereby establish a direct-current voltage across the load resistor 14 which is connected across one diagonal of the bridge circuit. A variable tap 15 on the load resistor 14 is connected to ground and to the base electrode 37 of a junction transistor 33. That portion of the load resistor 14 which lies between the variable tap 15 and the end which is connected to a parallel resonant output circuit 26 is shunted by a storage capacitor 16 such as described above in connection with Figure 1. A coupling capacitor 29 is connected between the collector electrode 36 of the junction transistor 33 and one of a pair of output terminals 30.

The operation of the circuit just described is similar to the operation of the circuit described in Figure 1 of the drawing. However, due to the greater efficiency of the bridge rectifier, the overall efficiency of the circuit is enhanced.

As is well known in the art, a bridge rectifier such as this is a full wave rectifier and, therefore, rectifies both the positive and negative portions of the received energy. It is, therefore, necessary that the emitter electrode 35 of the junction transistor 33 be connected to the junction of the bridge rectifier circuit and the inductor 12. As is well known in the rectifier art, a bridge rectifier operates to double the frequency of an input wave. Accordingly, this connection of the emitter electrode 35 is necessary to prevent the doubling of the modulation envelope frequency of the received carrier wave.

The junction transistor 33 is illustrated as a P–N–P unit having end zones of P type semi-conductive material and an intermediate zone of N type material. However, an N–P–N junction transistor may be substituted if the polarity of the bridge rectifier is reversed so that a properly polarized bias is provided.

Figure 3:
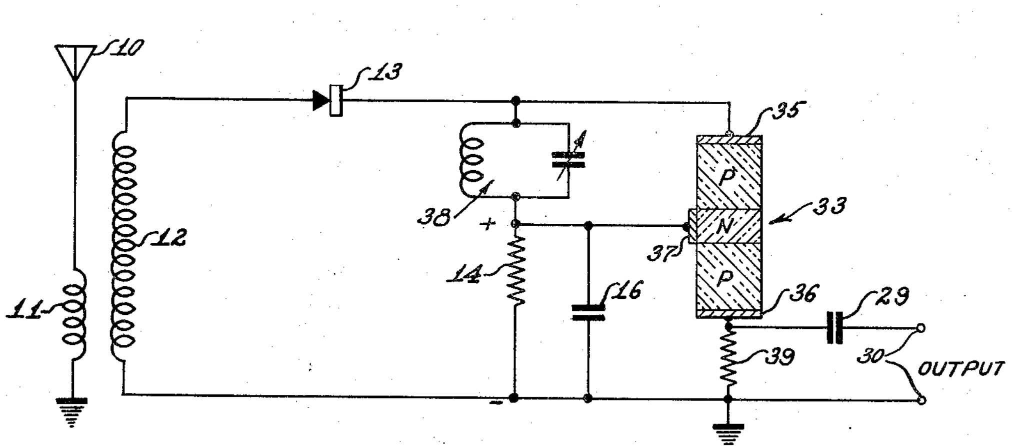
Figures 3, 4, 5 and 6 are schematic circuit diagrams of additional embodiments of a radio receiving system provided in accordance with the present invention.

In Figure 3 there is shown a receiving system which is a modification of that shown in Figure 1. In this instance, a junction type transistor is utilized in an emitter input circuit, and a parallel tuned circuit 38 is connected between the emitter electrode 35 and the base electrode 37 to provide a selection of the signal energy which is applied to the transistor to be amplified. Further, as this circuit provides a low impedance at other frequencies, a greater portion of the received energy, which is not to be selected for amplification, is utilized to provide biasing potentials for the transistor 33. In other words, the high impedance of the parallel resonant tuned circuit 31 at the desired frequency causes the signal energy of this frequency to be impressed between the emitter electrode 35 and the base electrode 37 while the remaining energy in that spectrum of energy which has been received by the antenna system and which has been rectified by the crystal rectifier 13 is impressed almost in its entirety across the network formed by the resistor 14 and the storage capacitor 16 for the purpose of developing biasing potentials.

The output circuit comprises a load resistor 39 connected between the collector electrode 36 and ground, and as above described, an output signal may be provided by means of a coupling capacitor 29 connected between the collector electrode 36 and one of a pair of output terminals 30.

It should be readily apparent from the above discussion that the circuit illustrated in Figure 3 is more efficient than the circuit illustrated in Figure 1 due to the fact that the load resistor 14 is used in its entirety for developing biasing potentials.

Figure 4:
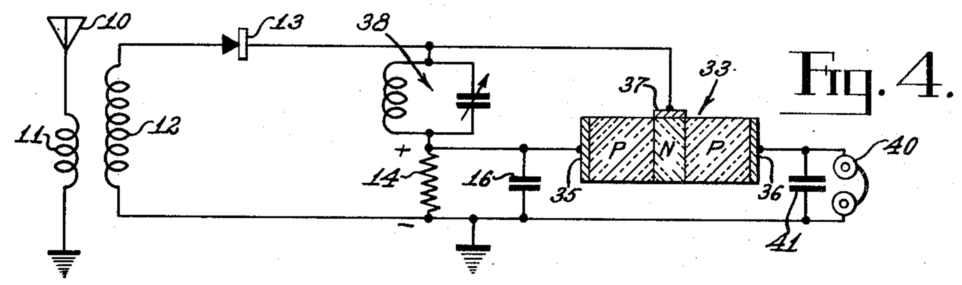

Referring now to Figure 4, the transistor 33 is operated as a base input amplifier with the input signal being derived from across the tuned circuit 38 and applied between the base electrode 37 and the emitter electrode 35. The biasing voltage is developed across the network formed by the load resistor 14 and the storage capacitor 16 and is applied between the emitter electrode 35 and the collector electrode 36.

An output circuit comprising a pair of headphones 40 shunted by a bypass capacitor 41 are connected between the collector electrode 36 and ground. The capacitor 41 may be selected to have a relatively low reactance at radio frequencies and a relatively high reactance at audio frequencies. It can thus be seen that an audio signal will be developed in the earphones which is representative of the amplified modulation envelope of the carrier wave selected by the parallel resonant tuned circuit 38.

Each of the above described amplifier circuits operates in what is commonly known as class B operation. This is due to the fact that no static bias potential is provided between the emitter and base electrodes.

Figure 5:
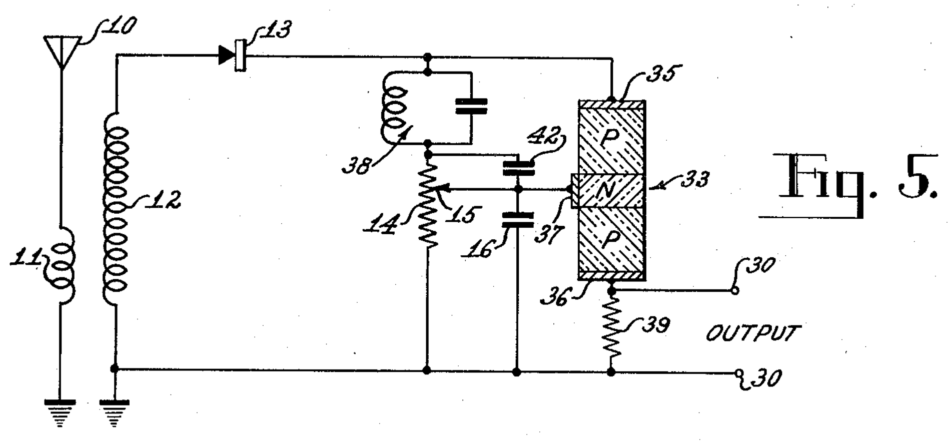

However, in Figure 5 there is illustrated a schematic circuit diagram substantially identical with that illustrated in Figure 3 except that the biasing arrangement is provided to enable class A operation of the amplifier circuit. This is accomplished by connecting an additional storage capacitor 42 between the variable tap 15 on the load resistor 14 and the junction of the load resistor 14 and the parallel resonant tuned circuit 38.

It can thus readily be seen that if the time constant of the circuit comprising the upper portion of the load resistor 14 and the additional storage capacitor 42 circuit is chosen to be relatively long compared to the lowest frequency of the amplified signals, a bias voltage in the forward direction will be applied between the base electrode 37 and the emitter electrode 35.

Figure 6:
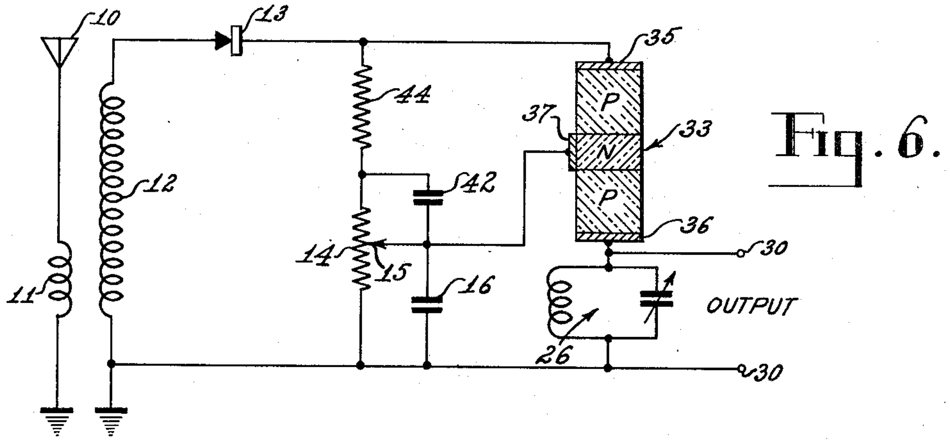

In Figure 6 there is shown a schematic circuit diagram which is a modification in accordance with the present invention of the receiving system shown in Figure 5. In place of the parallel resonant tuned circuit 38, a second load resistor 44 is connected between the crystal rectifier 13 and the upper end of the load resistance 14. A biasing arrangement to provide class A operation as shown in Figure 5 is also utilized in the schematic circuit diagram of Figure 6. Signal selection, however, is provided by means of a parallel resonant output circuit 26 connected in the collector electrode circuit in the same manner as the parallel resonant circuit 26 in Figures 1 and 2.

It can thus be seen that energy received by the antenna system will set up currents which are rectified by the crystal rectifier 13. Biasing voltages are accordingly developed across the series arrangement of the load resistors 44 and 14. That portion of the voltage, which is developed across the second load resistor 44, is in the form of a signal voltage impressed between the base electrode 37 and the emitter electrode 35. The remaining portion of the voltage, which is developed across the load resistor 14, is utilized to provide a bias voltage for the transistor to establish class A operation. The desired carrier wave energy is selected by the operation of the parallel resonant output circuit 26 and an amplified version thereof will appear across the output terminals 30.

Figure 7:
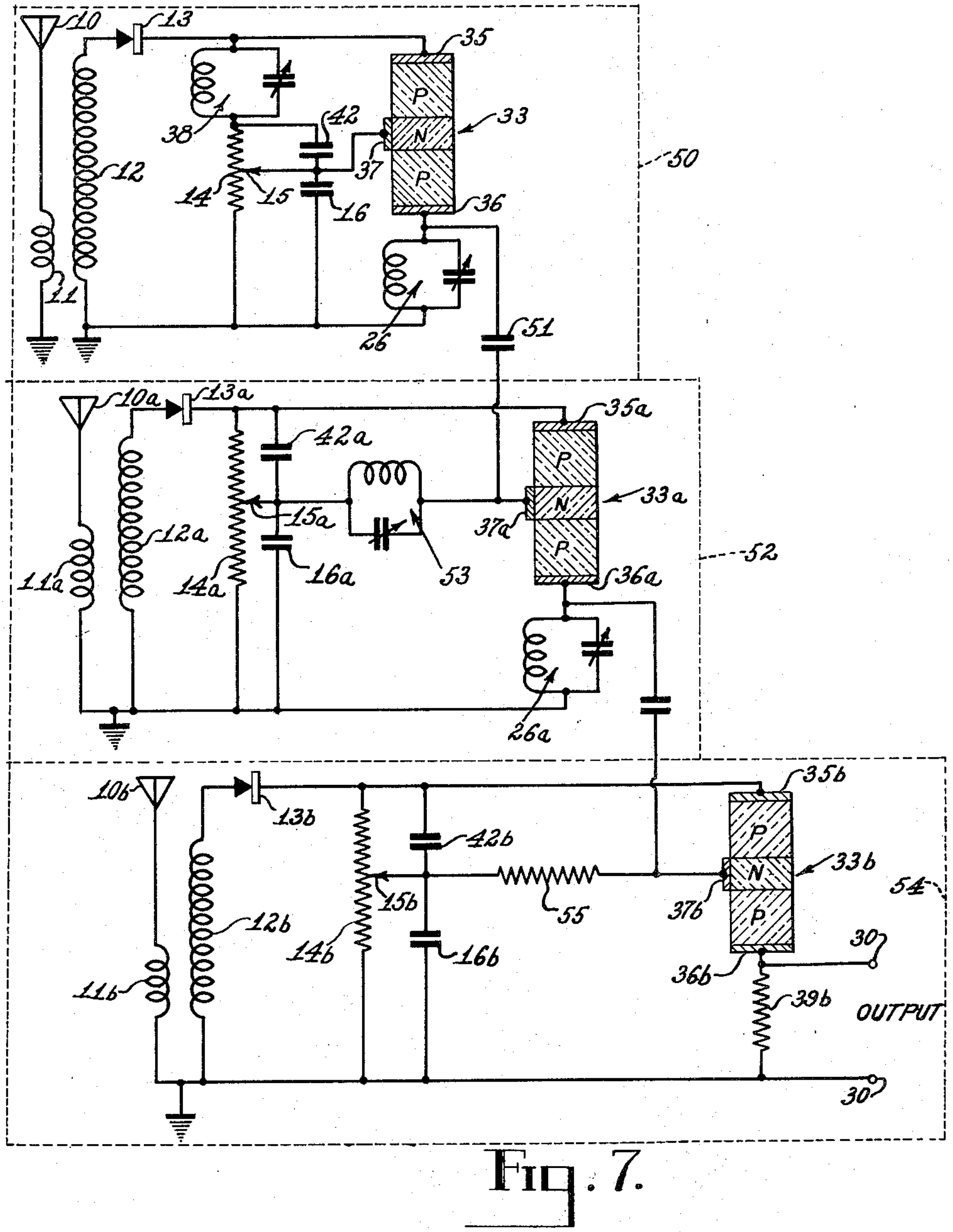
Figure 7 is a schematic circuit diagram of a radio receiving system provided in accordance with the present invention, having several stages utilized to give additional amplification.

The schematic circuit diagram illustrated in Figure 7 shows a receiving system comprising a plurality of cascaded receiver and amplifier circuits capable of providing higher amplification than the above described circuits.

The first stage of this system, which is enclosed within the dotted rectangle 50 comprises a receiving system which is a modification of that shown in Figure 6. In place of the load resistor 44 utilized in the circuit shown in Figure 6 there is connected a parallel resonant circuit 38 to enable more precise selection of the desired signal frequency. A coupling capacitor 51 connects the output of the receiving system 50 to the base electrode 37*a* of a second junction transistor 33*a* in a receiving system which is enclosed within the dotted rectangle 52. A parallel resonant tuned input circuit 53 is connected between the base electrode 37*a* and the variable tap 15*a* of the crystal rectifier load resistance 14*a* to provide additional signal selectivity and a sufficient load impedance for the output of the first transistor 33 at the desired frequency.

A parallel resonant output circuit 26*a* is also provided in the collector electrode circuit of the second transistor 33*a* for further frequency selection. The output of this circuit is applied to the base electrode of a third junction transistor 33*b* in a receiving system which is enclosed within the dotted rectangle 54. In this instance a resistor 55 is connected between the base electrode 37*b* and the variable tap 15*b* on the rectifier load resistor 14*b*.

The output of the third receiver amplifier circuit is developed across a collector electrode load impedance 39*b* which is connected between the collector electrode 36*b* and ground.

The operation of the above described circuit is as follows: Energy which is received by the antenna systems 10, 10*a*, and 10*b* is rectified in each of the receiving systems by the crystal rectifiers 13, 13*a* and 13*b*, thereby developing bias voltages across the rectifier load impedances 14, 14*a*, and 14*b* to provide class A operation.

Also, in the receiving system enclosed within the dotted rectangle 50, a portion of this energy is selected by the parallel resonant input circuit 38 and impressed between the emitter electrode 35 and the base electrode 37 to be amplified. Further selection of the desired frequency is provided in the output circuit by the parallel resonant output circuit 26 which is connected between the collector electrode 36 and ground. The signal voltage thus developed across the parallel resonant output circuit 26 is impressed on the base electrode circuit of the second receiving system 52 by means of the parallel resonant circuit 53. This signal voltage is further amplified by the transistor amplifier of the second receiving system circuit enclosed within the dotted rectangle 52, and an amplified signal voltage is developed across the parallel resonant output circuit 26*a*.

Further frequency selection is not necessary. Accordingly, the signal which is developed across the parallel resonant output circuit 26*a* is impressed across the base resistor 55. The signal voltage which is thus impressed across the base resistor 55 is amplified and appears across the output load resistor 39*b*.

As above mentioned, biasing potentials are provided by energy received by the antenna system 10, 10*a*, and 10*b*. It is noted that in the second and third receiving systems, the rectifier load resistors 14*a* and 14*b* are provided respectively with a pair of capacitors 42*a*, 42*b*, 16*a* and 16*b* which operate to provide biasing potentials for the second and third transistors 33*a* and 33*b*, but which do not provide further signal energy to be amplified. The selected signal energy which is to be amplified is provided solely from the first receiving system by the parallel resonant input circuit 38. In each of the other circuits the antenna system crystal, rectifier, and resistor capacitor networks are provided only to establish biasing potentials.

It is thus seen that a receiving system comprising one or more rectifiers connected with a transistor amplifier may provide operating potentials from received electrical energy. It is further seen that this system may be made in compact and durable form and requires no external source of biasing potentials such as batteries.

What is claimed is:

1. In a receiving system, the combination of, means including an inductor for receiving carrier wave energy, rectifying means for rectifying the received carrier wave energy, a load impedance connected in series with said rectifying means, the series combination of said rectifying means and said load impedance being connected in shunt with said inductor, a storage capacitor connected in shunt with a portion of said load impedance and adapted to be unidirectionally charged by electrical currents flowing through said rectifying means, a semi-conductor device having at least a base electrode and a collector electrode, and means connecting said capacitor in circuit with said base electrode and said collector electrode, whereby said collector electrode is operatively biased with respect to said base electrode.

2. In a receiving system, the combination of, means including an inductor for receiving carrier wave energy, rectifying means, a load impedance connected in series with said rectifying means, the series combination of said rectifying means and said load impedance being connected in shunt with said inductor, a storage capacitor connected in shunt with a portion of said load impedance and adapted to be unidirectionally charged by electrical currents flowing through said rectifying means, a transistor device having a base electrode, a collector electrode and an emitter electrode, circuit means connecting said capacitor in circuit with said base electrode and said collector electrode, and further circuit means connecting the remaining portion of said load impedance in circuit with said base electrode and said emitter electrode, whereby said collector electrode and said emitter electrode are operatively biased with respect to said base electrode.

3. In a receiving system, the combination of, a carrier wave receiving circuit, a semi-conductor device adapted to amplify a received signal and having at least a collector electrode, an emitter electrode and a base electrode, a rectifying means coupled to said receiving circuit, a rectifying means load circuit comprising a first and a second impedance element connected in series arrangement with said rectifying means, a storage capacitor connected in shunt with said second impedance means and adapted to be charged by a unidirectional current from said rectifying means, said storage capacitor and said second impedance having a time constant which is long relative to the lowest frequency to be amplified, said second impedance element being connected between said emitter electrode and said base electrode, and said first impedance element being connected between said collector electrode and said base electrode, whereby said operating bias potentials are applied to said semi-conductor device in response to said received carrier wave energy.

4. In a receiving system, the combination of, a first inductor adapted to receive radiated carrier wave energy, a second inductor electromagnetically coupled with said first inductor, a unidirectional conducting device, a parallel resonant tuned circuit and a load impedance connected in series arrangement in the order named in shunt with said second inductor, a storage capacitor connected in shunt with said load impedance, a semi-conductor device comprising a semi-conductive body, a base electrode, an emitter electrode and a collector electrode each in contact with said semi-conductive body, said base electrode being directly connected to the common junction of said unidirectional conducting device and said parallel resonant tuned circuit, said emitter electrode being directly connected to the common junction of said parallel resonant tuned circuit and said load resistor, and an output load impedance connected between said collector electrode and a common junction of said second inductor and said load impedance, whereby said collector electrode is biased with respect to said base electrode.

5. In a receiving system, the combination of, a first inductor adapted to receive radiated carrier wave energy, a second inductor electromagnetically coupled with said first inductor, a unidirectional conducting device, a parallel resonant tuned circuit and a load impedance connected in series arrangement in the order named in shunt with said second inductor, a storage capacitor connected in shunt with said load impedance, a semi-conductor device comprising a semi-conductive body, a base electrode, an emitter electrode and a collector electrode each in contact with said semi-conductive body, said emitter electrode being directly connected to the common junction of said unidirectional conducting device and said parallel resonant tuned circuit, said base electrode being directly connected to the common junction of said parallel resonant tuned circuit and said load resistor, and an output load impedance connected between said collector electrode and a common junction of said second inductor and said load impedance, whereby said collector electrode is biased with respect to said base electrode.

6. In a receiving system, the combination of, a first inductor adapted to receive radiated carrier wave energy, a second inductor electromagnetically coupled with said first inductor, a rectifying element, a first impedance element, a second impedance element connected in series in the order named in shunt with said second inductor, a variable tap on said second impedance element, a first capacitor connected between the junction of said first impedance element and said second impedance element and said variable tap, a second capacitor connected between the junction of said second impedance element and said second inductor and said variable tap, a semi-conductor device comprising a semi-conductive body, a base electrode, an emitter electrode and a collector electrode each in contact with said semi-conductive body, said base electrode being directly connected to said variable tap, said emitter electrode being directly connected to said junction of said first impedance element and said rectifying element, an output impedance element connected between said collector electrode and said junction of said second impedance element and said second inductor.

7. In a receiving system, the combination of, a first inductor adapted to receive radiated carrier wave energy, a second inductor electromagnetically coupled with said first inductor, a rectifying bridge arrangement connected in shunt with said second inductor, an impedance element connected across one arm of said rectifying bridge arrangement, a variable tap on said impedance element, a storage capacitor connected between said variable tap and one end of said impedance element, a semi-conductor device including a semi-conductive body, a base electrode, an emitter electrode and a collector electrode each in contact with said semi-conductive body, said emitter electrode being directly conductively connected to the junction of said second inductor and said rectifying bridge arrangement, said base electrode being connected to said variable tap, and an output impedance element connected between said collector electrode and said one end of said impedance element.

8. In a receiving system including a semi-conductor device adapted to amplify received signals and including a semi-conductive body having a plurality of electrodes cooperatively associated therewith, the combination of; means including an inductor for receiving carrier wave energy, rectifying means, a load circuit, and an energy storage circuit connected in series the series combination of said rectifying means, said load circuit, and said energy storage circuit being connected in shunt with said inductor for deriving direct current biasing voltages from said carrier wave energy of a magnitude to bias said device for signal amplifying operation; circuit means connecting said storage circuit between a pair of said plurality of electrodes; and further circuit means for connecting said load circuit between one of said pair of electrodes and another of said plurality of electrodes to render said device operative to amplify said signals.

9. In a receiving system, a plurality of receiver amplifier stages, each comprising means including an inductor for receiving carrier wave energy, rectifying means and energy storage means connected in series, the series combination of said rectifying means and energy storage means being connected in shunt with said inductor for deriving biasing voltages from said carrier wave energy, a semi-conductor device including a semi-conductive body having a plurality of electrodes cooperatively associated therewith, a first circuit means connecting said energy storage means between a pair of said plurality of electrodes for operatively biasing said device, one of said stages including frequency selective means coupled between one of said pair of electrodes and another of said plurality of electrodes for selecting a portion of said carrier wave energy as signal energy to be amplified by each of said stages.

10. In a receiving system including a semi-conductor device adapted to amplify received signals and including a semi-conductive body having a plurality of electrodes cooperatively associated therewith, the combination of, means including an inductor for receiving carrier wave energy, rectifying means and energy storage means connected in series, the series combination of said rectifying means and said energy storage means being connected in shunt with said inductor for deriving biasing voltages from said carrier wave energy, said derived biasing voltages being the sole source of energizing potentials for said device, load impedance means connected with said rectifying means and between a pair of said plurality of electrodes for applying a selected portion of said received signals to said device, and means including said storage means connected between one of said pair of electrodes and another of said plurality of electrodes for applying said derived biasing voltages therebetween to energize said device to amplify said signals.

References Cited in the file of this patent

UNITED STATES PATENTS

| | | |
|---|---|---|
| 2,144,606 | Burnside | Jan. 24, 1939 |
| 2,293,480 | Tovar | Aug. 18, 1942 |
| 2,373,569 | Kannenberg | Apr. 10, 1945 |
| 2,644,893 | Gehman | July 7, 1953 |
| 2,647,957 | Mallinckrodt | Aug. 4, 1953 |

OTHER REFERENCES

"A Crystal Receiver With Transistor Amplifier," Radio and Television News, January 1950, pp. 38, 39, 153, 154, 155.

"Junction Transistor Equivalent Circuits and Vacuum Tube Analogy," by Giacoletto, pp. 1490 to 1493 of Proc. I. R. E., vol. 40, No. 11, November 1952.